March 28, 1961 A. A. COWAN 2,976,882
CHECK VALVE
Filed July 25, 1957 2 Sheets-Sheet 1
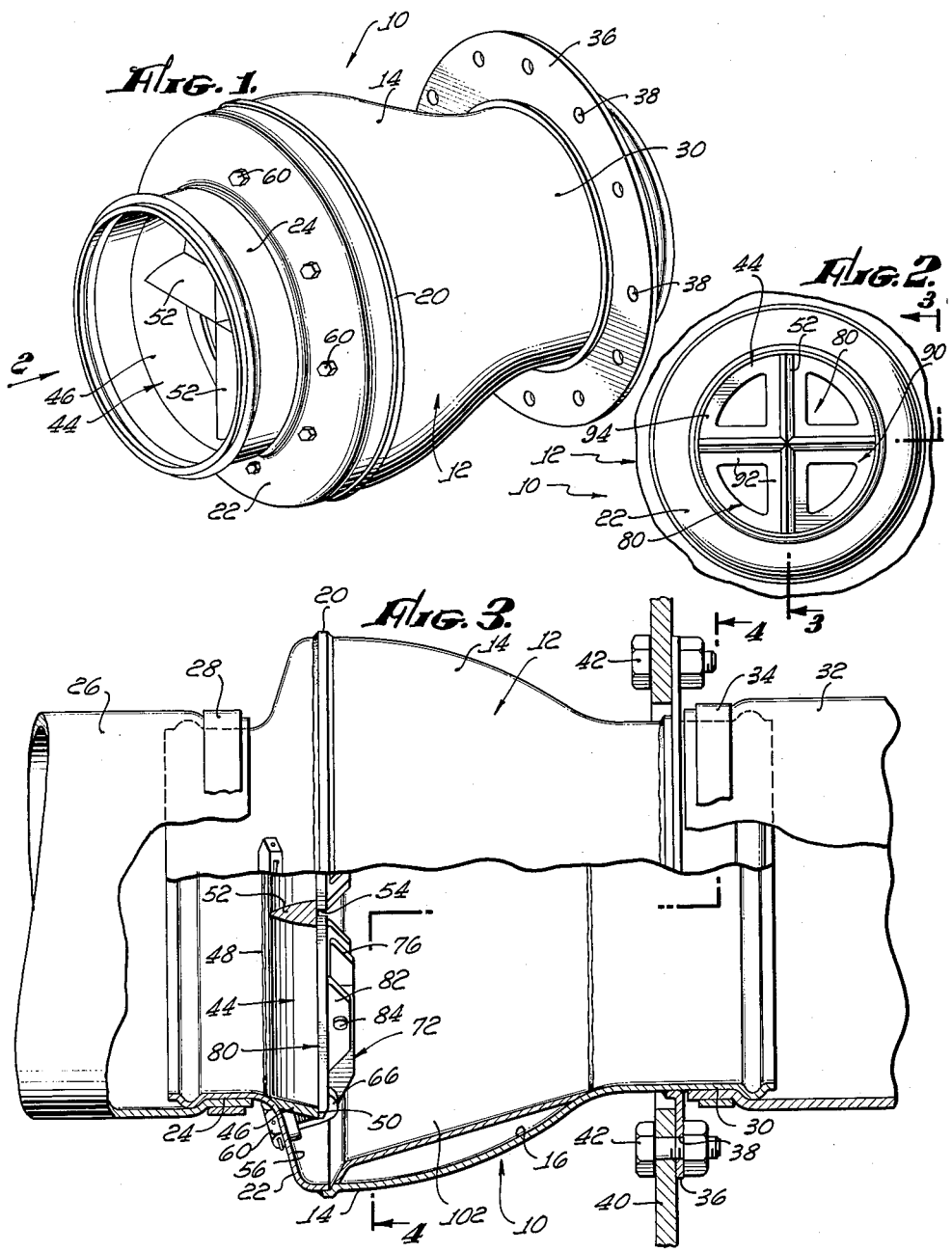
INVENTOR.
ARNOLD A. COWAN,
BY
Thomas P. Maluney
ATTORNEY.

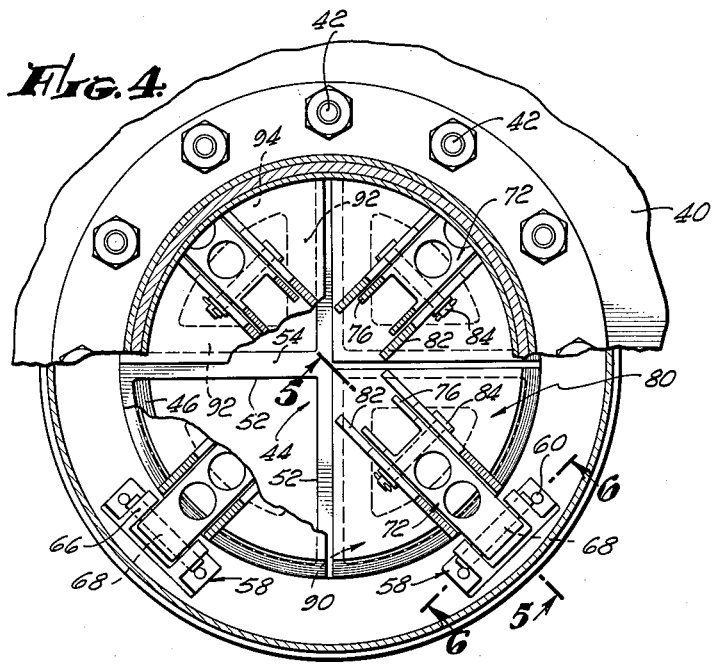
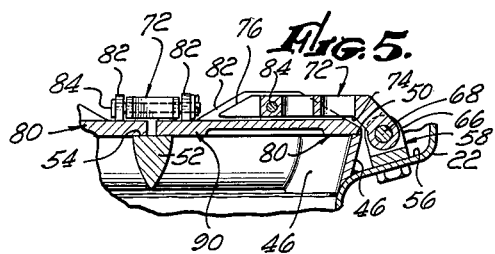
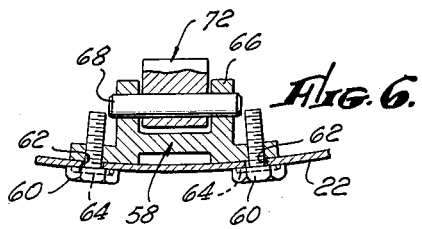
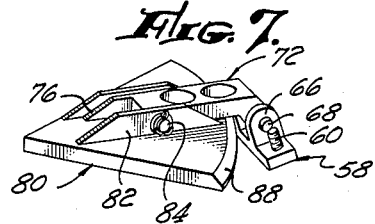
Arnold A. Cowan,
INVENTOR.
BY Thomas P. Maloney
ATTORNEY.

2,976,882
CHECK VALVE

Arnold A. Cowan, Los Angeles, Calif., assignor to Bobrick Manufacturing Corporation, Los Angeles, Calif., a corporation of Delaware Filed July 25, 1957, Ser. No. 674,106

2 Claims. (Cl. 137—512.1)

This invention relates to a check valve for fluid transmission systems and, more particularly, to a check valve adapted to be utilized in conduits conducting high temperature, high pressure air to prevent backflow through said conduits.

The utilization in present day aircraft of large volumes of high temperature air for air conditioning and heating purposes involves the utilization of check valves designed to prevent backflow through the conduits through which the air is transmitted so that reverse flow through the system cannot take place. Obviously, check valves utilized in systems of the aforementioned character must be characterized by their immediate response to reverse flow in such systems in order that such reverse flow may not establish fluid communication of the system with the source in a reverse direction.

Conventional check valves have not been adequate for such systems due to a variety of factors which include substantial weight and delayed response to the existence of reverse flow conditions in the system in which they are incorporated.

It is, therefore, an object of my invention to provide a check valve for use in preventing backflow in air distribution ducts which is characterized by its relatively light weight and by its immediate response to changes in the conditions in the system in which it is utilized.

An additional object of my invention is the provision of a check valve of the aforementioned character which includes a valve seat incorporating a circular seating portion which, in turn, supports a plurality of radial seating bars and which has associated with said bars a plurality of sector shaped valve members movable by reverse flow in the conduit in which the check valve is located into seating relationship with said circular seating portion and said bars.

In the embodiment of the invention disclosed hereinbelow, the valve incorporates four radial seating bars which intersect at the center of the valve intake opening and which have four sector shaped valve members associated therewith. By providing a plurality of sector shaped valve members, the mass of each valve member is substantially reduced and thus the valve members respond instantaneously to changes in the flow conditions in the systems in which they are incorporated, moving from open to closed positions and from closed to open positions with minimum lag after changes in such conditions have occurred within the conduits in which they are utilized.

Since the air in systems of the character under consideration here flows at high rates of speed at high pressures, it is desirable that minimal resistance to such flow be caused by the check valves utilized in the systems.

An associated object of my invention is the provision, in a check valve of the aforementioned character, of mounting brackets for the sector shaped valve members which are disposed between the wall of the valve chamber and the circular portion of the seat whereby the mounting brackets are completely removed from the air flow stream and thus the possibility that they might create turbulence and other undesirable characteristics in the air flow stream is eliminated.

A further object of my invention is the provision, in a fluid check valve of the aforementioned character, of locating pads within the valve chamber adapted to locate the individual valve members in predetermined open positions within the valve chamber. The locating pads thus prevent excessive movement of the valve members and maintain them in positions in which they can be most effectively acted upon by the air stream in order that they may be moved into seating relationship with the seat of the valve.

Other objects and advantages of my invention will be apparent from the following specification and the accompanying drawings which are for the purpose of illustration only and in which:

Fig. 1 is a perspective view showing a check valve constructed in accordance with the teachings of my invention;

Fig. 2 is an end elevational view taken in the direction of the arrow 2 of Fig. 1;

Fig. 3 is a vertical, sectional view taken on the broken line 3—3 of Fig. 2;

Fig. 4 is a vertical, sectional view taken on the broken line 4—4 of Fig. 3;

Fig. 5 is an enlarged, fragmentary, sectional view taken on the broken line 5—5 of Fig. 4;

Fig. 6 is a transverse, sectional view taken on the broken line 6—6 of Fig. 4; and Fig. 7 is a perspective view showing a valve member incorporated in the check valve of my invention in conjunction with the mounting arm and mounting bracket therefor.

Referring to the drawings and particularly to Figs. 1–3 thereof, I show a check valve 10 constructed in accordance with the teachings of my invention and including a housing 12, the wall 14 of which defines a valve chamber 16. The wall 14 is provided with a peripheral flange 20 at the left-hand extremity thereof, as viewed in Fig. 3 of the drawings, and said flange is adapted to have an end cap 22 welded therein, as best shown in Fig. 3 of the drawings, said end cap being provided with a reduced neck 24 adapted to receive the end of a conduit 26 which is maintained in operative relationship therewith by means of a clamp 28.

The right-hand extremity of the housing 12 is reduced in a manner similar to that in which the end cap 22 is reduced to provide a neck 30 for the reception of the extremity of a conduit 32 which is maintained in operative relationship therewith by means of a clamp 34. Mounted in operative relationship with the periphery of the neck 30 by means of welding, or the like, is a mounting collar 36 provided with a plurality of mounting holes 38 and adapted to facilitate the mounting of the valve 10 in a bulkhead 40, or the like, by means of fasteners 42.

The entire housing 12 may be formed from sheet metal, such as stainless steel or the like, and may be fabricated by spinning or other commonly accepted sheet metal forming techniques. The neck 24 of the housing 12 defines the inlet opening of the valve 10 while the neck 30 defines the outlet opening thereof and the flow of heated air or other fluid through the valve 10 is thus from the left-hand extremity to the right-hand extremity of said valve, as viewed in Fig. 3 of the drawings.

Mounted within the chamber 16 defined by the wall 14 of the housing 12 adjacent the inlet opening of the valve 10 is a valve seat 44, said valve seat including a flaring ring or circular portion 46 whose left-hand extremity is welded as at 48 to the interior of the end cap 22 adjacent the neck 24 thereupon. The circular portion 46 of the seat 44 thus provides a continuous circular seating face 50 which, as best shown in Fig. 3 of the drawings, faces downstream in the direction of the right-hand extremity of the valve 10.

Mounted upon or formed integrally with the circular portion 46 of the valve seat 44 is a plurality of radial bars 52 which are, as best shown in Fig. 3 of the drawings, of airfoil or substantially semi-elliptical cross-sectional configuration with the apex of the semi-ellipse facing in the direction of fluid flow. The inner extremities of the radial bars 52 intersect on the longitudinal axis of the valve 10 and said bars are provided on the rearward portions thereof with flat seating faces 54 which, as best shown in Fig. 3 of the drawings, are coplanar with the circular seating face provided on the circular portion 46 of the valve seat 44. It is, therefore, apparent that the seat 44 is divided into four quarters by the radial bars 52 and the radial bars 52 serve, in conjunction with the circular portion 46 of the valve seat 44, to provide coplanar seating surfaces which, nevertheless, offer minimum obstruction to the free flow of fluid through the valve 10.

It is to be noted that, as best shown in Figs. 3 and 5 of the drawings, the periphery of the circular portion 46 of the seat 44 is disposed in spaced relationship with the inner surface of the end cap 22 to define a space 56 isolated from the airflow stream, for a purpose which will be described in greater detail below.

The semi-elliptical configuration of the radial bars 52 materially reduces the resistance of the bars to the flow of air therepast and serves also to channel the flow of air through the body of the housing 12.

Located in the space 56 is a plurality of mounting brackets 58, said mounting brackets being demountably secured by means of bolts 60 in operative relationship with the wall of the end cap 22. The shanks of the bolts 60 pass through openings 62 in the wall of the end cap 22, as best shown in Fig. 6 of the drawings, and there are O-rings 64 mounted in the heads of said bolts to prevent fluid leakage through the openings 62.

Each of the brackets 58 is substantially H-shaped in configuration and is provided with spaced mounting legs 66 supporting a pivot pin 68, as best shown in Figs. 4–7 of the drawings. The mounting brackets 58 are thus disposed within the space 56 between the periphery of the circular portion 46 of the valve seat 44 and the adjacent wall of the end cap 22 and are thus isolated from the flow of fluid through the valve 10. Therefore, the brackets 58 which might constitute an obstruction to such flow and which might also cause turbulence and other undesirable flow characteristics in the fluid flowing through the valve 10 are completely isolated and the flow of fluid is not impeded thereby.

Since the brackets 58 are mounted upon bolts 60, they can be readily removed from operative relationship with the end cap 22, thus permitting them to be replaced should the need for such replacement arise.

Mounted on the pivot pins 68 at their inner extremities are elongated mounting arms 72. The inner extremities of the mounting arms 72 are bent, as at 74, and the outer extremities thereof extend radially therefrom when the mounting arms are disposed in overlying relationship with the valve seat 44, as best shown in Fig. 5 of the drawings. The mounting arms 72 are provided with bifurcated outer extremities 76, for a purpose which will be described in greater detail below.

Mounted upon the arms 72 are valve members 80 which are engageable in seating relationship with the valve seat 44, in a manner to be described in greater detail below. Each of the valve members 80 is sector-shaped and is provided on the back thereof with axially directed mounting lugs 82 engageable by a pivot pin 84 extending therethrough and through the body of the associated mounting arm 72.

Since the valve members 80 are sector-shaped, they are substantially triangular in configuration with the outer edges thereof being arcuate and beveled, as at 88, to clear the angularly oriented inner extremity 74 of the arm 72, as best shown in Fig. 7 of the drawings. Each of the valve members 80 is provided with a continuous sealing face 90 which, as best shown in Figs. 2 and 4 of the drawings, includes two straight legs 92 and an arcuate leg 94, the straight legs 92 being engageable with the radial bars 52 on opposite sides of the valve member 80 and the arcuate leg 94 being engageable with the contiguous portion of the circular seat 50 on the circular portion 46 of the valve seat 44.

The relationship of the back of each of the valve members 80 with the associated mounting arm 72 is graphically illustrated in Fig. 5 of the drawings wherein the back of a valve member 80 is shown as spaced a slight distance from the underside of the mounting arm 72 to allow limited pivotal movement of the valve member 80 with respect to the mounting arm 72, said pivotal movement being limited by engagement of the back of the valve member 80 with the bifurcated outer extremity 76 of the mounting arm 72 and with the inner portion of the mounting arm 72 adjacent the angularly oriented extremity thereof. Since the lugs 82 on the back of each of the valve members 80 are disposed adjacent the opposite sides of the mounting arm 72, they serve to prevent cocking of the associated valve member 80 on the mounting arm 72.

Also illustrated by the fragmentary view of Fig. 5 is the manner in which the sealing face 90 on each of the valve members 80 engages the co-planar sealing surfaces 50 and 54 on the circular portion 46 and seating bars 52 of the valve seat 44. It will also be noted that no springs or other auxiliary means are provided to assist the valve members 80 in moving into seating relationship with the valve seat 44.

The reason the valve members 80 are not provided with auxiliary spring or other motivating means is that the mass of the valve members 80 is relatively small so that they can be moved by fluid action alone into closed positions and into seating relationship with the valve seat 44 when reverse flow through the associate conduit occurs. On the contrary, when normal flow through the conduits takes place, said normal flow will immediately deflect the valve members 80 and the associated mounting arm into open positions in which they engage an annular insert 102 which is welded to the wall 14 of the housing 12, Fig. 3, said insert locating the mounting arms 72 and thus the valve members 80 supported thereupon in positions in which they do not materially obstruct the flow of fluid through the valve 10 and in which they are, nevertheless, exposed to reverse flow through the valve in order that they may immediately respond to such reverse flow by moving into seating relationship with the valve seat 44.

The limited pivotal movement of the valve members 80 with respect to the mounting arms 72 therefor permits the seating faces 90 upon the valve members 80 to engage the seating faces 50 and 54 on the valve seat 44 and to register accurately therewith. Pivotal movement of the valve members 80 with respect to the mounting arms 72 therefor is limited by impingement of adjacent portions of the backs of the valve members 80 on said mounting arms.

If any of the valve members 80 needs replacing, the entire assembly of valve member, mounting arm, and bracket can be removed by unscrewing the bolts 60 from operative relationship with the associated bracket 58 and installing a new assembly in its place.

I claim as my invention:

1. In a fluid control valve, the combination of: a housing incorporating a chamber; a valve seat member in said housing including a circular portion projecting into said chamber in spaced relationship with the wall of said chamber, said circular portion incorporating a plurality of fixed, intersecting, diametrical bars of uniform semi-elliptical cross section having flat surfaces thereupon which provide, in conjunction with the flat end of said circular portion, four valve seats disposed in the same plane; mounting brackets supported in said chamber in the space between said circular portion and said wall; radially oriented mounting arms pivotally secured to said brackets; and four sector shaped valve members each pivotally secured to said mounting arms and movable by fluid in said chamber into seating relationship with said valve seats to prevent flow of fluid from said chamber.

2. In a fluid control valve, the combination of: a housing incorporating a chamber; a valve seat member in said housing including a circular portion projecting into said chamber in spaced relationship with the wall of said chamber, said circular portion incorporating a plurality of fixed, intersecting, diametrical bars of uniform semi-elliptical cross section having flat surfaces thereupon which provide, in conjunction with the flat end of said circular portion, four valve seats disposed in the same plane; mounting brackets supported in said chamber in the space between said circular portion and said wall; radially oriented mounting arms pivotally secured to said brackets; and four sector shaped valve members each pivotally secured to said mounting arms and movable by fluid in said chamber into seating relationship with said valve seats to prevent flow of fluid from said chamber, each of said valve members having an integral sealing face engageable with the corresponding seat on said valve seat member.

References Cited in the file of this patent

UNITED STATES PATENTS

| | | |
|---|---|---|
| 103,596 | Frisbie | May 31, 1870 |
| 301,230 | Green | July 1, 1884 |
| 303,702 | Carricaburu | Aug. 19, 1884 |
| 1,023,885 | Smyth | Apr. 23, 1912 |
| 1,076,302 | McElroy | Oct. 21, 1913 |
| 1,112,135 | Harkom | Sept. 29, 1914 |
| 1,673,831 | Kuehne | June 19, 1928 |
| 2,267,797 | Martin | Dec. 30, 1941 |
| 2,419,318 | Johnson | Apr. 27, 1947 |
| 2,610,064 | Goddard | Sept. 9, 1952 |
| 2,831,499 | Myron | Apr. 22, 1958 |
| 2,856,956 | Smolensky | Oct. 21, 1958 |

FOREIGN PATENTS

| | | |
|---|---|---|
| 26,783 | Great Britain | Nov. 18, 1909 |